March 18, 1941. H. GREENLY 2,235,104
INDUCTOR TYPE ELECTRIC RELAY
Filed March 12, 1938 3 Sheets-Sheet 3
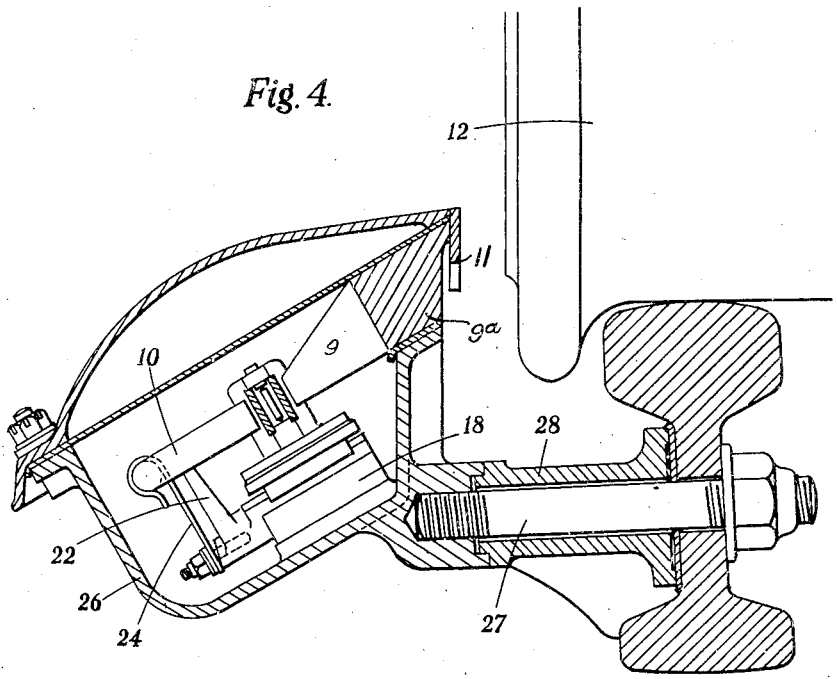
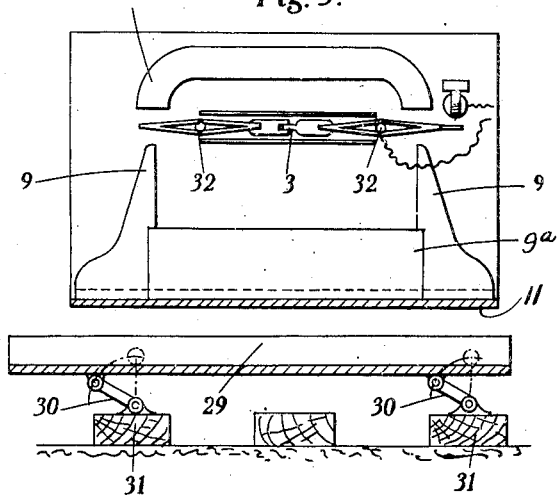 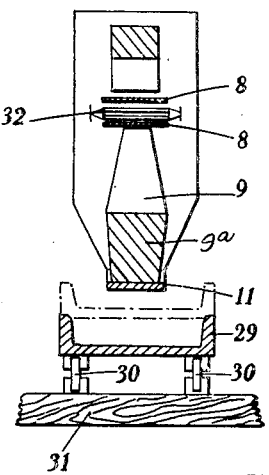
INVENTOR
H. GREENLY.
BY
ATTORNEYS.

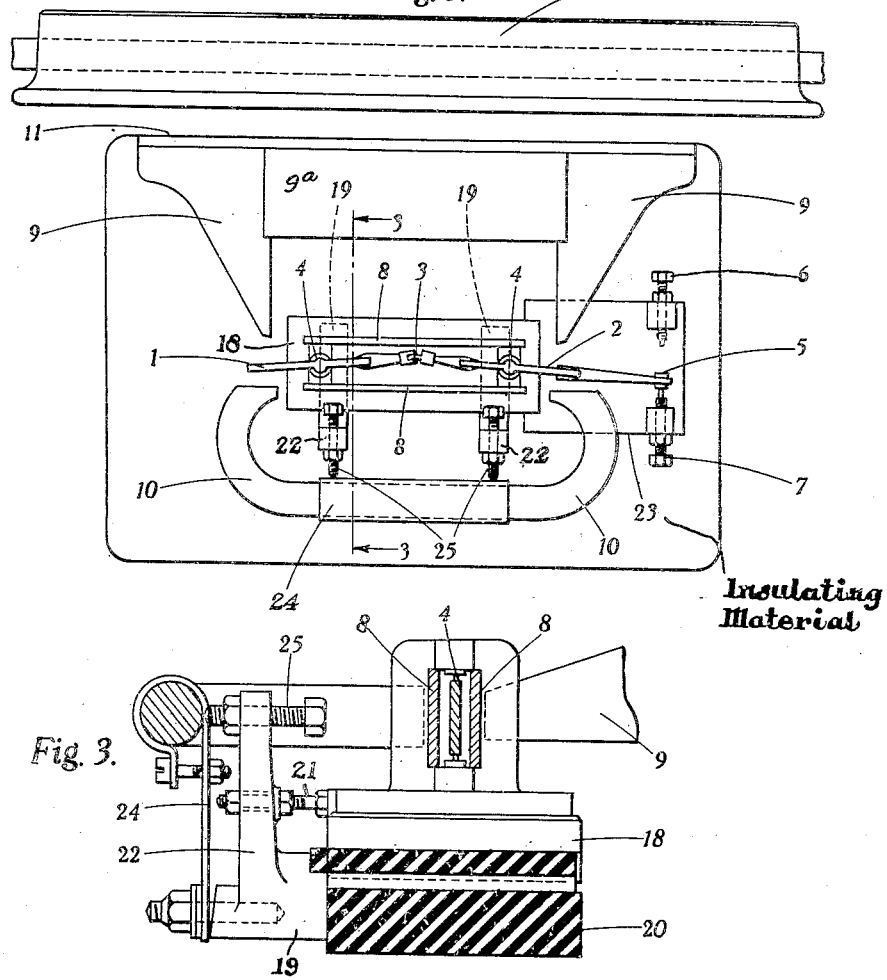

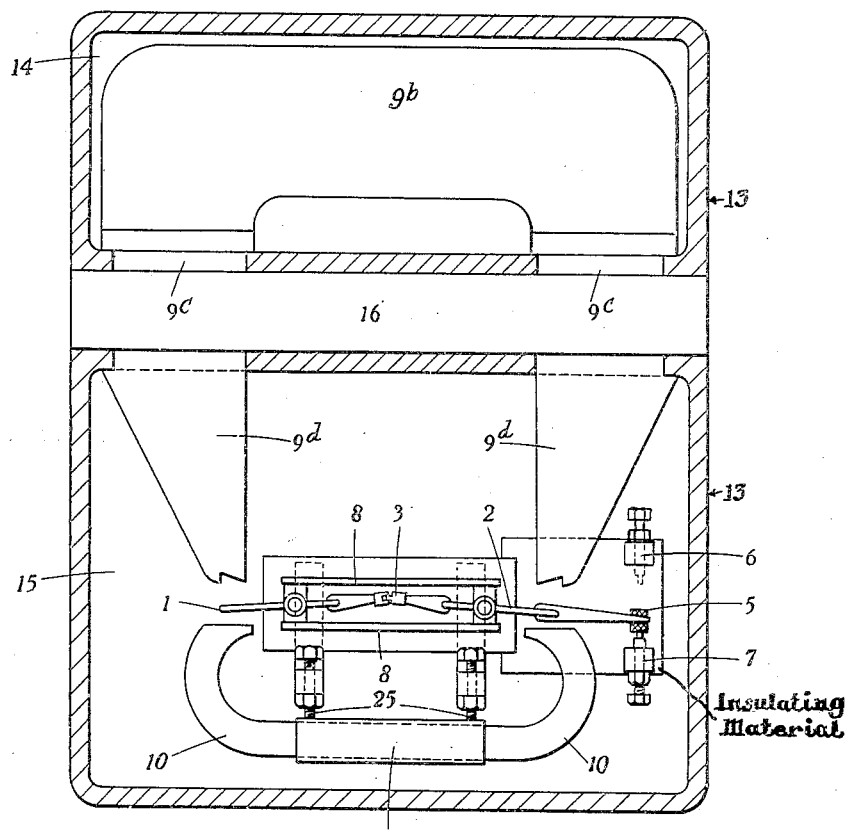

Patented Mar. 18, 1941

2,235,104

UNITED STATES PATENT OFFICE 2,235,104

INDUCTOR TYPE ELECTRIC RELAY

Henry Greenly, Hounslow, England, assignor to Greenly Engineering Models Limited, Heston-Hounslow, Middlesex, England, a British company Application March 12, 1938, Serial No. 195,633
In Great Britain April 30, 1937

5 Claims. (Cl. 200—98)

This invention relates to an inductor type electric relay in which a contact is made or broken by the magnetic attraction of a pivoted armature.

The object of the present invention is to effect certain improvements in a relay of the above type which will result in more rapid action thus enabling the same to be actuated under conditions where a less responsive relay would fail to operate.

The principal improvement according to the present invention is to provide an armature which is balanced within itself.

This is attained by constructing the armature from two parts which are pivotally mounted so as to balance each other and connected by a coupling which permits the two parts to move in opposite directions.

When employed in a relay an armature as above is mounted in suitable juxtaposition to the poles of a magnet and such magnet is preferably of either one of two forms, a magnet having double headed pole pieces or a magnet having divided pole pieces which are separated by a gap. In the first arrangement the armature is released by causing a magnetic member to move in close proximity to the outer pair of poles so as to reduce the attraction between the other pair of poles and the armature.

In the second arrangement the reduction in attraction is effected by causing the magnetic member to enter the gap formed by the divided pole pieces.

A further feature of the invention which may be adopted to reduce the inertia of the armature consists in screening the armature bearings from the magnetic field of the magnet by a device which is composed of magnetic material so arranged as to expose only the outer ends of the armature to the magnetic field.

A still further and important feature which may also with great advantage be adopted when using a magnet having double headed pole pieces is a plate of soft iron or other permeable magnetic material, of any suitable cross-section, which is fitted closely against the faces of the outer pair of poles so as to be common to both poles for the purpose of assisting the dissipation of the magnetic flux on the approach of the magnetic member.

The poles of the magnet which are adjacent to the exposed ends of the armature may with advantage, be greatly reduced in area at their extremities to produce a high concentration of the magnetic flux in the region of each exposed end of the armature.

A magnet for use in a relay according to the present invention is preferably of the permanent type but wound electro-magnets may also be used or permanent magnets moderated by the use of wound coils introduced into their flux circuits. Where permanent magnets are used both as a main magnet and a supplementary pull off magnet it is found that the same are best arranged with unlike poles adjacent to each other but the invention is not to be limited in this respect.

One of the useful applications of a relay according to this invention is as a substitute for the usual mechanical railway treadle and in such an application the relay is either positioned on or in close proximity to the track and the operating magnetic member on the locomotive, carriage or truck, or vice-versa.

As previously explained above there are two general types of relay according to the present invention; one in which the magnetic flux is dissipated by the proximity of a magnetic member to the outer poles of a magnet having double headed pole pieces and the other by screening the exposed ends of the armature from the magnetic flux by the use of a magnet having divided pole pieces which are separated to provide a gap for the interposition of the magnetic screening member when it is desired to reduce the attraction between the magnet and the armature and release the latter to make and/or break a circuit. To enable the invention clearly to be understood and carried into effect examples of both types of relay will now be described, by way of example, by aid of the accompanying drawings, in which—

Fig. 1 is a plan view, somewhat diagrammatic, illustrating the improved relay according to the first mentioned type.

Fig. 2 is a similar view but illustrating the improved relay according to the second mentioned type.

Fig. 3 is a cross-section, to an enlarged scale, on the line 3—3 of Fig. 1.

Fig. 4 is a sectional elevation showing the improved relay enclosed in an oil-tight casing and mounted upon the stock rail of a railway track.

Fig. 5 is a diagrammatic view, illustrating the embodiment in which the relay is mounted on the locomotive, carriage or truck with the magnetic member situated between or in proximity to the track, and constituted by a channel member mounted on links so as to be capable of being raised and lowered with a parallel motion into and out of an operating position in relation to a passing relay.

Fig. 6 is a transverse section through Fig. 5.

Referring generally to the drawings the embodiments of the improved inductor type relay therein illustrated comprise an armature which is composed of two parts 1, 2, which are coupled together by a ball and socket joint 3 or other suitable form of connection which will permit the two parts to move in opposite directions. Each part of the armature is pivoted at 4 so that the parts are in balance. The outer end of the part 2 carries a double point contact 5 adapted to make contact with contact points 6 or 7 arranged in an outside circuit.

The armature pivots and the connecting joint are screened from magnetic influences by a magnetic shroud or screen consisting of two parallel bars 8 of permeable iron disposed on opposite sides of the armature and of such length as to leave the outer ends of the two parts of the armature exposed in the magnetic field. Whilst two parallel bars are preferred as giving more effective screening, especially where a supplementary pull off magnet is used, a single bar may be used on that side of the armature which is adjacent to the main magnet.

A magnetic shroud as used in this invention serves to conduct the lines of magnetic force and thereby provide magnetic protection to the armature bearings. This is particularly effective where steel ball or roller bearings are used to provide the pivotal bearings for the parts of the armature.

The main magnet 9a, preferably of the permanent type, is mounted with its pole pieces 9 in juxtaposition to the exposed portions of the armature. The extremities of the pole pieces 9 are of greatly reduced area to produce a high concentration of the magnetic flux in the region of each exposed portion of the armature. The preferred shape for this purpose is substantially that illustrated in Fig. 1 of the drawings for the first mentioned type of relay and in Fig. 2 of the drawings for the second mentioned type of relay.

In each of the examples illustrated a supplementary magnet 10 is used to retract the parts of the armature away from the main magnet when the attraction therebetween is broken and such is preferred, especially a permanent magnet, but a spring or other means may be used for this purpose wtihout departing from the invention.

Fig. 1 shows the preferred construction having a magnet 9a provided with a pair of induced poles 9, each pole being double ended, the outer end of each pole being permanently connected by a plate 11 of soft iron or other suitable magnetic material which is fitted closely against the faces of the poles, thereby serving to concentrate the magnetic field surrounding the poles, so that upon the approach of a magnetic member, which is shown in this figure as the wheel of a railway locomotive, carriage or truck, the magnetic field is diverted much more quickly due to the concentration effected by plate 11 and the relay is permitted to operate more rapidly.

In the arrangement shown in this figure the arms 1 and 2 of the armature are normally attracted towards the inner ends of the induced poles 9 of the main magnet 9a so that contacts 5 and 6 are in engagement. When however the magnetic member 12 is in the magnetic field surrounding the plate 11 the magnetic influence of the main magnet on the induced poles is reduced and the armature is permitted thereby to move under the influence of the pull-off magnet 10 whereupon contact 5 engages with contact 7. As soon as the magnetic member 12 moves out of the field the induced poles again attract the armature to its normal position.

In Fig. 2 is illustrated the second type of relay according to this invention and comprising a magnet having induced pole pieces. In this embodiment a casing 13 is provided which is divided into two portions 14 and 15 a gap 16 being left between them for the introduction of the magnetic screen. The portion 14 contains the magnet which is shown as a permanent magnet 9b having poles 9c. The poles 9c are in two portions and oppose each other across the gap the portions 9d forming the induced pole pieces being contained within the part 15 of the casing so that the magnetic lines of force extend across the gap and are concentrated on the armature by means of the opposite portions of the induced pole pieces which are inset into the wall of the portion 15 of the casing. The inner ends of the pole pieces are shaped as shown to enable the maximum concentration to be obtained in the region of the exposed ends of the armature.

In this embodiment operation of the armature is effected by the introduction of a magnetic screen into the gap 16 which prevents the magnetic field set up by the pole of the permanent magnet in the portion 14 of the casing, from passing to the pole portions in the section 13, whereupon the armature is pulled over to the position shown in the drawings by the pull-off magnet 10 the armature returning to the normal position when the magnetic screen is removed from the gap 16.

With this arrangement the relay could be carried by a locomotive and the magnetic screen may consist of strips of soft iron permanently fixed alongside the track so that as the locomotive passes these strips pass through gap 16 and effect operation of the relay.

An inductor type relay according to the present invention, has, for preference, an adjustable mounting for the armature which permits the same to be moved bodily in relation to the poles of the main magnet for the purpose of adjusting the gap.

As shown in Figs. 1 and 2 this mounting comprises a base 18 which is slidably mounted on parallel slides 19 carried by a block of insulating material 20 screwed or otherwise secured to the casing of the instrument.

The slidable base 18 carries the armature pivots 4 and the magnetic screen, whilst adjusting screws 21 are provided by which adjustments may be made, such screws operating in correspondingly threaded holes provided in brackets 22 forming part of the slides 19.

The slidable base 18 is provided with an extension at one end in the form of a block 23 of insulating material upon which are mounted the contact points 6 and 7, so that when adjustments are made to the gap between the armature and the magnet the position of these contacts relative to each other remains undisturbed.

Provision may also be made for the fine adjustment of the gap between the poles of the pull back magnet and the armature. This is effected in the example illustrated by clamping this magnet to the upper end of a bracket 24, the lower end of which is screwed or otherwise affixed to the lower ends of each bracket 22. Adjustments are effected by moving the bracket laterally by the adjusting screws 25 which operate in correspondingly threaded holes in the upper ends of the brackets 22.

As illustrated in Fig. 4 the relay is described in connection with Fig. 1 is shown as a substitute for the usual mechanical railway treadle. The relay is enclosed in a sealed casing 26 which protects the same from atmospheric or climatic conditions, dirt, etcetera. In this embodiment the instrument may be positioned either on or in close proximity to the track, and is operated in the first case by the wheel 12 of a passing train and in the second case by a magnetic member carried on the train.

In the arrangement shown the instrument is bolted to a stock or running rail by means of a stud or studs 27 the casing being provided with distance pieces 28 to provide the necessary space between the instrument casing and the flange of a passing wheel. Preferably the distance pieces are tubular or of round cross section to prevent stones or the like from lodging thereon with the attendant risk of damage to the instrument by a passing wheel.

The plate 11 of magnetic material is attached to the lid of the casing and when such casing is of metal, the plate may be attached by welding or by brazing, but when the casing is made of non-metallic material other means of fixing are necessary.

The instrument as illustrated may be assembled and laboratory tested, and sealed in its casing before being put into use, terminals being provided in the exterior of the casing to enable the necessary electrical connections to be made.

Figs. 5 and 6 illustrate the embodiment in which the relay is mounted on the locomotive, carriage or truck, the magnetic member being situated between or in close proximity to the track. The relay is constructed similarly to the arrangement described in connection with Fig. 1 and therefore needs no further description.

In this embodiment the magnetic member is constituted by a member 29 of channel section which is carried by links 30 mounted on the sleepers 31 so as to be capable of being raised and lowered with a parallel motion into and out of an operating position in relation to a passing relay.

In this embodiment is shown the preferred construction of armature in which the weight is reduced to a minimum by making the same of skeleton formation. This is particularly suitable where a high speed of operation is required.

According to this embodiment the two parts of the armature are each made of twin plates of thin permeable iron or other suitable magnetic material which embrace a pin 32 to constitute a lateral pivot each pair of plates being united at one or both ends by riveting or welding.

I claim as my invention:

1. An electric relay of the type specified comprising, in combination, an armature consisting of two portions each made from magnetic material, a pivotal mounting for each portion disposed intermediate the length of the same so that the portions are in balance with each other, a jointed coupling attached to the inner ends of said armature portions for maintaining said portions substantially in alignment and serving to constrain the two portions to move simultaneously but in opposite directions, and a magnet situated in proximity to the armature portions so as normally to hold the armature portions in the attracted position and arranged so that the attraction on the armature portions may be broken by a diversion of the magnetic field to permit said armature portions to move away from said magnet.

2. An electric relay of the type specified comprising in combination, an armature consisting of two portions each made from magnetic material, a pivoted mounting for each portion disposed intermediate the length of the same so that the portions are in balance with each other, a jointed coupling attached to the inner ends of said armature portions for maintaining said portions substantially in alignment and serving to constrain the two portions to move simultaneously but in opposite directions, a magnet situated in proximity to the outer ends of the armature portions so as normally to hold the armature portions in the attracted position and arranged so that the attraction on the armature portions may be broken by a diversion of the magnetic field, and a further magnet for pulling said armature portions away from the said first magnet when said attraction is broken.

3. An electric relay of the type specified comprising, in combination, an armature consisting of two portions each made from magnetic material, a pivotal mounting for each portion disposed intermediate the length of the same so that the portions are in balance with each other, a jointed coupling attached to the inner ends of said armature portions for maintaining said portions substantially in alignment and serving to constrain the two portions to move simultaneously but in opposite directions, and a magnet having pole pieces formed with inner and outer ends, the inner ends being in proximity to the outer ends of the armature portions so as normally to hold the armature portions in the attracted position in relation to the inner ends of said poles, said attraction adapted to be broken by the intermittent production of a juxtaposed relationship between a magnetic metallic mass and the outer ends of said pole pieces to effect a diversion of the magnetic field from the inner ends of the pole pieces to the metallic mass.

4. An electric relay of the type specified comprising, in combination, an armature consisting of two portions each made from magnetic material, a pivotal mounting for each portion disposed intermediate the length of the same so that the portions are in balance with each other, a jointed coupling attached to the inner ends of said armature portions for maintaining said portions substantially in alignment and serving to constrain the two portions to move simultaneously but in opposite directions, and a magnet having induced pole pieces separated from the magnet by a gap the inner ends of said induced pole pieces being in proximity to the outer ends of the armature portions so as normally to hold the armature portions in the attracted position in relation to the inner ends of said poles, said attraction adapted to be broken by the interposition within the said gap of a magnetic screen to effect a diversion of the magnetic field from the inner ends of the induced pole pieces.

5. An electric relay of the type specified comprising, in combination, an armature consisting of two portions each made from magnetic material, a pivoted mounting for each portion disposed intermediate the length of the same so that the portions are in balance with each other, a jointed coupling attached to the inner ends of said armature portions for maintaining said portions substantially in alignment and serving to constrain the two portions to move simultaneously but in opposite directions, a magnet situated in proximity to the outer ends of the armature portions so as normally to hold the armature portions in the attracted position and arranged so that the attraction on the armature portions may be broken by a diversion of the magnetic field to permit said armature portions to move away from said magnet, and a magnetic shroud interposed between said armature portions and said magnet, said shroud being of such a length as to expose only the outer ends of the armature portions to the magnetic field.

HENRY GREENLY.